(12) United States Patent
Ikemoto et al.

(10) Patent No.: US 8,283,073 B2
(45) Date of Patent: Oct. 9, 2012

(54) MICROPOROUS POLYOLEFIN MEMBRANE

(75) Inventors: Takashi Ikemoto, Tokyo (JP); Yoshihiro Imamura, Tokyo (JP); Takeshi Onizawa, Tokyo (JP)

(73) Assignee: Asahi Kasei E-Materials Corporation, Tokyo (JP)

( * ) Notice: Subject to any disclaimer, the term of this patent is extended or adjusted under 35 U.S.C. 154(b) by 495 days.

(21) Appl. No.: 12/525,028

(22) PCT Filed: Jan. 23, 2008

(86) PCT No.: PCT/JP2008/050846
§ 371 (c)(1),
(2), (4) Date: Jul. 29, 2009

(87) PCT Pub. No.: WO2008/093572
PCT Pub. Date: Aug. 7, 2008

(65) Prior Publication Data
US 2010/0021822 A1    Jan. 28, 2010

(30) Foreign Application Priority Data

Jan. 30, 2007   (JP) ................................ 2007-019461

(51) Int. Cl.
*H01M 2/16* (2006.01)
*B32B 3/26* (2006.01)
(52) U.S. Cl. ................ 429/249; 429/254; 428/315.5
(58) Field of Classification Search ............ 429/252, 429/176, 339, 247, 249, 254; 428/310.5; 427/115; 521/27
See application file for complete search history.

(56) References Cited

U.S. PATENT DOCUMENTS

| | | | | |
|---|---|---|---|---|
| 3,639,174 A * | 2/1972 | Kegelman | ................ | 429/339 |
| 5,514,461 A * | 5/1996 | Meguro et al. | ........... | 428/310.5 |
| 6,514,561 B1 * | 2/2003 | Mallant et al. | ............. | 427/115 |
| 2002/0192560 A1 * | 12/2002 | Nishimura et al. | ........ | 429/252 |
| 2005/0019665 A1 * | 1/2005 | Adachi et al. | ............. | 429/254 |
| 2007/0148552 A1 | 6/2007 | Ikemoto et al. | | |
| 2008/0193833 A1 | 8/2008 | Ohashi et al. | | |

FOREIGN PATENT DOCUMENTS

| | | |
|---|---|---|
| JP | 5-21050 | 1/1993 |
| JP | 5-52012 | 2/1993 |
| JP | 6-96753 | 4/1994 |
| JP | 6-212006 | 8/1994 |
| JP | 6-336535 | 12/1994 |
| JP | 9-50800 | 2/1997 |
| JP | 10-50286 | 2/1998 |
| JP | 2961387 | 8/1999 |
| JP | 2002-88188 | 3/2002 |
| JP | 2003-217554 | 7/2003 |
| JP | 2005-239773 | 9/2005 |
| JP | 2006-278182 | 10/2006 |
| JP | 2010-7053 | 1/2010 |
| KR | 10-2006-0103932 | 10/2006 |
| WO | WO 2006/038532 A1 | 4/2006 |
| WO | WO-2006/106783 A1 | 10/2006 |

OTHER PUBLICATIONS

"Viscosity of Molecular Weight Distribution of Ultrahigh Molecular Weight Polyethylene Using a High Temperature Low Shear Rate Rotational Viscometer"; Wagner, H.L., Journal of Applied Polymer Science, vol. 36, 567-582, 1988.*
"Performance of Solupor® separator materials in lithium ion batteries", FGB Ooms et al., Journal of Power Sources 97-98 (2001) 598-601.*
"SOLUPOR® Membranes", Lydall, Inc., 2012. Retrieved online on Feb. 29, 2012 from: http://www.lydallfiltration.com/products/liquid/Solupor.shtml.*
Supplementary European Search Report dated Dec. 2, 2010.
Office Action dated Apr. 8, 2011 issued in corresponding Korean Application.

* cited by examiner

*Primary Examiner* — Jonathan Crepeau
*Assistant Examiner* — Kenneth Douyette
(74) *Attorney, Agent, or Firm* — Finnegan, Henderson, Farabow, Garrett & Dunner, L.L.P.

(57) ABSTRACT

The present invention provides a microporous polyolefin membrane having a porosity of 45% to 85% wherein the microporous polyolefin membrane easily absorbs the strain produced when the membrane undergoes compression, and retains excellent permeability and excellent electrical insulation performance even after compression by setting the maximum pore diameter at 0.1 μm to 0.23 μm, the MD elastic modulus at 400 to 2,000 MPa, and the ratio MD elastic modulus/TD elastic modulus at 1.5 to 9.

10 Claims, No Drawings ed film to fall off. This may reduce the electrical insulation of the microporous membrane, which may result in battery safety problems such as an internal short circuit.

MICROPOROUS POLYOLEFIN MEMBRANE

TECHNICAL FIELD

The present invention relates to a microporous polyolefin membrane, a nonaqueous electrolyte-based secondary battery separator, and a nonaqueous electrolyte-based secondary battery that use the membrane.

BACKGROUND ART

Microporous polyolefin membranes are widely used as membranes for the separation or permselective separation of various substances and as materials for the isolation of various substances. Examples of the use of the membranes may include microfiltration membranes, fuel cell separators, capacitor separators, base materials for functional membranes to allow a novel function to develop by filling pores with a functional material, and battery separators. Among such examples, microporous polyolefin membranes are preferable as separators for lithium-ion batteries widely used in mobile devices such as laptop personal computers, cell phones, and digital cameras. The reasons for this may include the fact that microporous polyolefin membranes have good mechanical strength, electrical insulation performance, and shutdown function.

Conventionally, a carbon material such as non-graphitizable carbon or graphite is used as a material for the negative electrode of lithium-ion batteries. The packing density of such a carbon material (carbon active material) has recently been increasing every year for higher-capacity batteries. Here, a negative electrode using a carbon active material is known to swell during charging. So, a higher packing density of the carbon active material tends to result in much greater swelling of the negative electrode.

On the other hand, alloy negative electrode materials using metals or metalloids (e.g., silicon [Si], tin [Sn]) are being studied as novel negative electrode materials for higher capacity. These alloy negative electrode materials can provide a much higher capacity than carbon active materials. However, these alloy negative electrode materials generally swell much more than carbon active materials.

Patent Document 1 discloses a technology in which in a lithium-ion secondary battery having a high packing density of a carbon active material, the curved corners of the prismatic battery have a lower content of the carbon active material to absorb the strain caused by electrode swelling.

Patent Document 2 discloses a technology in which a combination of simultaneous biaxial stretching with a solvent contained and stretching after solvent extraction provides less change in permeability during compression, absorbing electrode swelling.

In addition, Patent Documents 3 and 4 disclose membranes having a high porosity and a high ion permeability.

Patent Document 1: Japanese Patent Laid-Open No. 2006-278182
Patent Document 2: International Publication No. WO 2006/106783
Patent Document 3: Japanese Patent No. 2961387
Patent Document 4: Japanese Patent Laid-Open No. 2008-88188

DISCLOSURE OF THE INVENTION

Problems to be Solved by the Invention

However, in view of further improvement in practicality, including safety, of batteries using an electrode having a high packing density or an alloy negative electrode, it is desirable to further improve microporous polyolefin membranes used as separators.

Specifically, in some cases, the application of a conventional microporous polyolefin membrane to a battery causing great electrode swelling causes the following problems:

(1) when the separator undergoes compression, the membrane may be crushed, resulting in reduced permeability to lithium ions. This may degrade the cycle performance representing battery life;

(2) especially in prismatic batteries, electrode swelling easily causes a fold to develop. This results in battery swelling, degrading the discharge performance and the cycle performance; and (3) electrode swelling may break the separator, reducing the electrical insulation. This may cause an internal short circuit, degrading the battery safety.

Under these circumstances, an object of the present invention is to provide a microporous polyolefin membrane which easily absorbs the strain produced when the membrane undergoes compression and which retains excellent permeability and excellent electrical insulation performance even after compression.

Means for Solving the Problems

To solve the problems, the present inventors looked at the cushioning properties of a microporous membrane. As used herein, cushioning properties are an indicator showing how the membrane thickness and ion permeability change when a pressure is applied in the direction of membrane thickness. "Good cushioning properties" means that the membrane thickness decreases adequately when a pressure is applied in the direction of membrane thickness (good strain absorption) and at the same time the membrane retains good ion permeability even after compression.

In other words, the present inventors do not aim at a membrane which is not deformed by electrode swelling, so-called a "difficult-to-be-crushed membrane," but at an easy-to-deform membrane. Good strain absorption means that it is possible to ensure a space large enough in a battery to absorb electrode swelling during charging and discharging. For this reason, good strain absorption tends to make it difficult to cause strain-induced membrane pore clogging, reduced permeability, a fold, and the like. As a result, a battery in which degradation in cycle performance and battery swelling are inhibited can be realized.

Moreover, a microporous membrane is required to retain a high permeability and a high electrical insulation even after the microporous membrane is deformed by electrode swelling, in addition to strain absorption. As used herein, permeability refers to ion permeability after undergoing compression, an indicator which can be evaluated by air permeability after compression. A lower permeability results in a lower ion permeability even if the stain caused by electrode swelling is absorbed, thereby reducing the cycle performance in some cases. In short, it seems to be important to microporous membranes to ensure strain absorption and permeability after compression.

In addition, as used herein, electrical insulation refers to the electrical insulation performance of a microporous membrane inside a battery, an indicator which can be evaluated by the puncture strength and withstand voltage of the microporous membrane. Especially in a battery causing great electrode swelling, electrode swelling may allow raised and depressed portions of the electrode active material to break through the microporous membrane or may allow a coated edge of the electrode active material to tear (cut) a microporous membrane. To obtain excellent battery safety, it is desirable to ensure the electrical insulation performance (no loss of the microporous membrane) even after the membrane is subjected to compression produced by the electrodes or to voltage application via battery winding.

Based on these considerations, the present inventors have conducted intensive studies and found that in a microporous membrane having an adequately high porosity, a microporous polyolefin membrane which easily absorbs the strain produced when the membrane undergoes compression and which retains excellent permeability and excellent electrical insulation performance even after compression can be realized by separately setting the maximum pore diameter, the longitudinal elastic modulus, and the ratio of the longitudinal elastic modulus to the transverse elastic modulus in a certain range and combining these parameters.

Specifically, the present invention is as follows:

[1] A microporous polyolefin membrane having a porosity of 45% to 85%, wherein a maximum pore diameter is 0.1 μm to 0.23 μm, a longitudinal (MD) elastic modulus is 400 MPa to 2,000 MPa, and a ratio of the MD elastic modulus to a transverse (TD) elastic modulus is 1.5 to 9.

[2] The microporous polyolefin membrane according to [1], wherein a MD tensile strength is 50 to 500 MPa.

[3] The microporous polyolefin membrane according to [1] or [2], wherein a TD tensile strength is 10 MPa to 200 MPa.

[4] The microporous polyolefin membrane according to any one of [1] to [3], wherein a TD elastic modulus is 60 MPa to 1,000 MPa.

[5] The microporous polyolefin membrane according to any one of [1] to [4], wherein a TD maximum shrinkage stress is 500 kPa or less.

[6] The microporous polyolefin membrane according to any one of [1] to [5], wherein a pore diameter ratio of the maximum pore diameter to an average pore diameter (maximum pore diameter/average pore diameter) is 1 to 1.55.

The microporous polyolefin membrane according to any one of [1] to [6], comprising 5% by mass to 90% by mass of an ultra-high molecular weight polyethylene having a limiting viscosity (η) of 5.5 dL/g to 33 dL/g.

A nonaqueous electrolyte-based secondary battery separator, comprising the microporous polyolefin membrane according to any one of [1] to [7].

The nonaqueous electrolyte-based secondary battery separator according to [8], wherein the separator is used as an alloy negative electrode-based lithium-ion secondary battery separator, or a prismatic lithium-ion secondary battery separator.

A nonaqueous electrolyte-based secondary battery, comprising the nonaqueous electrolyte-based secondary battery separator according to [7] or [8].

Advantage of the Invention

The microporous polyolefin membrane according to the present invention is a microporous polyolefin membrane which easily absorbs the strain produced when the membrane undergoes compression and which retains excellent permeability and excellent electrical insulation performance even after compression.

Best Mode for Carrying Out the Invention

The best mode for carrying out the invention (hereinafter referred to as "embodiment") will be described below in detail. However, the present invention is not limited to the embodiment below and can be carried out with various variations made within the scope of the gist of the invention.

The microporous polyolefin membrane of the present embodiment is formed from a polyolefin resin composition mainly comprising a polyolefin resin. Mainly comprising a polyolefin resin is preferable in view of realizing good shutdown performance when used as a battery separator.

Here, as used in the description of the present embodiment, "mainly comprising" means that the content of a specific component in all components is preferably 50% by mass or more, more preferably 55% by mass or more, much more preferably 60% by mass or more, particularly preferably 80% by mass or more, and most preferably 90% by mass or more, and means that the content may be 100% by mass.

As the polyolefin resin, polyolefin resins used for common extrusion, injection molding, blown film extrusion, blow molding, and the like can be used. Examples of the polyolefin resin may include homopolymers, copolymers, and multi-stage polymers obtained by using, as a monomer(s), one or more selected from the group consisting of ethylene, propylene, 1-butene, 4-methyl-1-pentene, 1-hexene, and 1-octene. These can be used alone or in combination of two or more.

In addition, examples of the polyolefin resin may include low-density polyethylene (whose density is lower than 0.93 g/cm$^3$), linear low-density polyethylene, medium-density polyethylene (whose density is 0.93 to 0.94 g/cm$^3$), high-density polyethylene (whose density is greater than 0.94 g/cm$^3$), ultra-high molecular weight polyethylene, propylene homopolymers (e.g., isotactic polypropylene, atactic polypropylene. As used in herein, a "propylene homopolymer" refers to a polypropylene wherein the content of ethylene monomer units is 1 mol % or less), ethylene-propylene random copolymers, polybutene, and ethylene propylene rubber.

Moreover, as the polyolefin resin, polyethylene is preferably used alone in view of increasing the permeability and the mechanical strength. Especially, high-density polyethylene or medium-density polyethylene is preferably used in view of membrane strength.

As the polyolefin resin, in view of increasing the mechanical strength, an ultra-high molecular weight polyethylene having a limiting viscosity (η) of 5.5 dL/g to 33 dL/g or a polypropylene having a limiting viscosity (η) of 1 dL/g to 25 dL/g (more preferably 2 dL/g to 7 dL/g) is preferably used.

In addition, the content of the ultra-high molecular weight polyethylene or the polypropylene in the polyolefin resin composition is preferably 5% by mass or more, and more preferably 10% by mass or more, and as the upper limit, preferably 95% by mass or less, more preferably 90% by mass or less, and much more preferably 80% by mass or less. 5 to 90% by mass of an ultra-high molecular weight polyethylene having a limiting viscosity (η) of 5.5 dL/g to 33 dL/g is preferably used in view of increasing the mechanical strength. Moreover, 5 to 80% by mass of an ultra-high molecular weight polyethylene having a limiting viscosity (η) of 5.5 dL/g to 33 dL/g is preferably used in view of moldability. Furthermore, 10 to 95% by mass of high-density polyethylene is preferably used in view of increasing the permeability of a microporous polyolefin membrane.

The polyolefin resin composition may contain an inorganic powder (sometimes hereinafter referred to as an "inorganic filler"). As such an inorganic filler, an inorganic filler having a melting point of 200° C. or more, a high electrical insulation, and electrochemical stability over the working range of lithium-ion secondary batteries is preferably used.

Examples of the inorganic filler may include silica, calcium silicate, aluminum silicate, alumina, calcium carbonate, magnesium carbonate, kaolin clay, talc, titanium oxide, carbon black, and diatomaceous earths. These can be used alone or in combination of two or more. Silica is preferably used in view of dispersion and ease of extraction.

The percentage (mass fraction) of the mass of the inorganic filler in the total mass of the polyolefin resin and the inorganic filler is preferably 0% or more, more preferably 1% or more, much more preferably 3% or more, and particularly preferably 5% or more, and as the upper limit, preferably 90% or less, more preferably 80% or less, much more preferably 70% or less, and particularly preferably 60% or less. An inorganic filler is preferably added in view of improving the affinity for an electrolyte and the impregnation with an electrolyte. In contrast, an inorganic filler having a mass fraction of 90% or less is preferable in view of the ability to form a porous membrane precursor (described later) which is uniform and in sheet form by melt membrane formation without compromising productivity.

Moreover, various additives can also be added to the polyolefin resin composition as needed. Examples of such additives may include phenol-, phosphorus-, sulfur-, and other substance-based antioxidants; metal soaps such as calcium stearate and zinc stearate; ultraviolet absorbers; light stabilizers; antistatic agents; anti-fogging agents; coloring pigments; lubricants; and antiblocking agents.

In the present embodiment, the process for producing the microporous polyolefin membrane is not particularly limited, and examples thereof may include:

(I) a method that makes the membrane porous by melting and kneading a polyolefin resin and a plasticizer, forming the resulting product into a sheet, and then extracting the plasticizer;

(II) a method that makes the membrane porous by melting and kneading a polyolefin resin, extruding the resulting product at a high draw ratio, and then subjecting the extrudate to heat treatment and stretching to separate the polyolefin crystal interface;

(III) a method that makes the membrane porous by melting and kneading a polyolefin resin and an inorganic filler, forming the resulting product into a sheet, and then stretching the sheet to separate the interface between the polyolefin resin and the inorganic filler; and (IV) a method that makes the membrane porous by dissolving a polyolefin resin, immersing the dissolved product in a poor solvent for the polyolefin resin, and then coagulating the polyolefin resin and at the same time removing the solvent.

Among these methods, the (I) method is preferable in view of better control of pore diameter and mechanical strength. The (I) method includes, for example, the following (a) to (e) steps:

(a) the step of mixing a polyolefin resin (mentioned above), a plasticizer, an additive (mentioned above), and as needed, an inorganic filler (mentioned above) with a Henschel mixer, or the like for pelletizing;

(b) the step of melting and kneading the mixture prepared in the (a) step in an extruder with a T-die installed at the tip;

(c) the step of extruding the kneaded product obtained in the (b) step from the T-die, rolling the extrudate with heated rolls between the both sides, and cooling the rolled product into a sheet (forming a microporous membrane precursor in sheet form);

(d) the step of extracting and removing the plasticizer and as needed the inorganic powder from the microporous membrane precursor in sheet form and drying the resulting sheet; and (e) the step of stretching and heat-treating the dried sheet.

As the plasticizer, for example, an organic liquid material or an organic solid material can be used. More specifically, examples of the plasticizer may include phthalic esters such as dioctyl phthalate, diheptyl phthalate, and dibutyl phthalate; organic acid esters such as adipate and glycerate; phosphate esters such as trioctyl phosphate; and liquid paraffin, solid wax, and mineral oil. These can be used alone or in combination of two or more.

Among them, phthalic esters are preferable in view of compatibility with polyethylene, low air permeability, and low bubble point.

Through the (a) step, or the all steps, the plasticizer is preferably added to the polyolefin resin at such a ratio that uniform melting and kneading are possible, a microporous membrane precursor in sheet form can be formed, and the productivity is not compromised.

The percentage (mass fraction) of the mass of the plasticizer in the total mass of the polyolefin resin, the plasticizer, and an inorganic filler added as needed is preferably 30% or more and more preferably 40% or more, and as the upper limit, preferably 80% or less and more preferably 70% or less. The plasticizer mass fraction of 80% or less is preferable in view of maintaining the melt tension during melting and forming and ensuring the moldability. In contrast, the plasticizer mass fraction of 30% or more is preferable in view of obtaining a uniform thin membrane. In other words, the mass fraction of 30% or more can provide sufficient plasticization efficiency, draw crystal lamellae folded in crystalline state efficiently, and realize a uniform and fine pore structure without cutting polyolefin chains even at a high stretch ratio, resulting in a high membrane strength. Moreover, the mass fraction of 30% or more tends to reduce the extrusion load during extrusion and thus also is preferable in view of realizing a high productivity.

In addition, the percentage (mass fraction) of the mass of the polyolefin resin in the total mass of the polyolefin resin, the plasticizer, and an inorganic filler added as needed is preferably 10% or more and more preferably 20% or more, and as the upper limit, preferably 50% or less and more preferably 40% or less. The percentage of the polyolefin resin is preferably 10% or more to increase the mechanical strength of a microporous membrane, and preferably 50% or less to improve membrane formation during extrusion and the permeability of the microporous membrane.

As a method of obtaining the molten and kneaded product containing the polyolefin resin and the plasticizer, or the molten and kneaded product containing the polyolefin resin, the inorganic filler, and the plasticizer in the (a) and (b) steps, preferably, the polyolefin resin alone, or the polyolefin resin and other compounds are fed into a resin kneading machine (e.g., extruder, kneader, Labo Plastomill, kneading roll, Banbury mixer) and kneaded with a plasticizer fed at any ratio while heating and melting the resin to obtain a uniform solution.

Especially preferably, a polyolefin resin and a plasticizer, or a polyolefin resin, an inorganic filler, and a plasticizer are first kneaded at a specified ratio in advance with a Henschel mixer or the like, and then the kneaded product is fed into an extruder (e.g., twin-screw extruder) and while the product is heated and melted, the remainder of the specified amount of the plasticizer is fed (for example, by side feeding) at any ratio for further kneading. The use of such a method can provide a sheet having a higher dispersibility, allowing for stretching at a high ratio without breaking the membrane.

In the (c) step, the molten and kneaded product is formed into a sheet. As a method of producing a formed sheet by extruding, cooling, and solidifying the molten and kneaded product, a method of extruding a polyolefin resin and a plasticizer, or a uniform melt of a polyolefin resin, an inorganic filler, and a plasticizer via a T-die or the like into a sheet and bringing the extrudate in contact with a heat conductor to cool the extrudate to a temperature sufficiently lower than the crystallization temperature of the resin can be used.

In the (d) step, the plasticizer and the like are extracted from the microporous membrane precursor in sheet form.

The method of extracting the plasticizer and the like may be batch-type or continuous-type, and preferably immerses the microporous membrane precursor in an extraction solvent to extract the plasticizer and the like, dries the membrane sufficiently, and virtually removes the plasticizer and the like from the porous membrane. To reduce the shrinkage of the porous membrane, the ends of the porous membrane are preferably restricted in the series of immersion and drying steps. In addition, the mass fraction of the plasticizer and the like remaining in the porous membrane after extraction is preferably less than 1% by mass.

Preferably, the extraction solvent is a poor solvent for polyolefin resins and a good solvent for plasticizers and inorganic fillers. In addition, the boiling point of the extraction solvent is preferably lower than the melting point of a porous polyolefin resin membrane.

Examples of such an extraction solvent may include hydrocarbons such as n-hexane and cyclohexane; halogenated hydrocarbons such as methylene chloride and 1,1,1-trichloroethane; non-chlorine-based halogenated solvents such as hydrofluoroether and hydrofluorocarbon; alcohols such as ethanol and isopropanol; ethers such as diethyl ether and tetrahydrofuran; ketones such as acetone and methyl ethyl ketone; and alkali aqueous solutions such as sodium hydroxide and potassium hydroxide.

As the stretching process in the (e) step, any of uniaxial stretching and biaxial stretching can preferably be used. Among them, biaxial stretching is preferable in view of the strength of the membrane obtained and the like. Biaxial stretching at a high ratio allows for molecular orientation in the surface direction, resulting in a difficult-to-tear, stable structure with a tendency to obtain a high puncture strength. In addition, as the stretching method, simultaneous biaxial stretching, sequential biaxial stretching, multi-stage stretching, and multiple stretching can be used alone or in combination of two or more, but simultaneous biaxial stretching is most preferably used in view of increasing the puncture strength and uniform stretching and shutdown properties. As used herein, simultaneous biaxial stretching refers to a technique involving simultaneous stretching in MD and in TD, and the deformation ratios (stretch ratios) in the directions may be different. Sequential biaxial stretching refers to a technique involving independent stretching in MD and in TD, and during stretching in MD or TD, the sheet is unrestricted or immobilized to a fixed length in the other direction.

Here, in the present embodiment, MD is defined as the longitudinal direction as mentioned above, and refers to the direction in which the resin is extruded (machine direction, flow direction). In contrast, TD is defined as the transverse direction as mentioned above, and refers to the direction of the width of the sheet extruded in sheet form (the direction approximately perpendicular to the machine direction).

The stretch ratios in the individual directions are preferably 3.5 or more to 8 or less in MD and 1.2 or more to 3.5 or less in TD, and more preferably 4 or more to 7 or less in MD and 1.5 or more to 3 or less in TD. To obtain excellent strain absorption and excellent permeability, the MD stretch ratio is preferably 3.5 or more, and to increase the electrical insulation performance during compression, preferably 8 or less. However, if the stretching step is divided into a plurality of smaller steps, the total stretch ratio is considered.

In addition, to obtain excellent strain absorption, excellent permeability, and increased electrical insulation performance during compression, the TD stretch ratio is preferably 1.2 or more. Stretching 1.2 times or more also causes polymer orientation in TD, spreading the pores in the microporous membrane in TD as well. Eventually, the sheet is unlikely to tear during compression and thus can have excellent electrical insulation performance during compression. However, to increase the high-temperature electrical insulation performance, the TD stretch ratio is preferably 3.5 or less. If the stretching step is divided into a plurality of smaller steps, the total stretch ratio is considered.

The ratio of the MD stretch ratio to the TD stretch ratio is preferably 1.5 to 5, more preferably 2 to 5, and much more preferably 2.5 to 5. The ratio between the stretch ratios is preferably 1.5 or more in view of obtaining excellent strain absorption and excellent high-temperature electrical insulation performance, and the ratio between the stretch ratios is preferably 5 or less in view of increasing the electrical insulation performance during compression. This range allows for easy control of mechanical strengths in the direction of membrane thickness, the longitudinal direction, and transverse direction and the ratio thereof.

The MD stretch rate is preferably 10 to 400%/s, more preferably 50 to 400%/s, and much more preferably 80 to 400%/s in view of increasing the mechanical strength and the resistance to membrane rupture. Stretch rate is an important factor for controlling the maximum pore diameter, the mechanical strength, and the ratio thereof. The MD stretch rate is preferably 10%/s or more in view of optimizing the maximum pore diameter and obtaining excellent permeability and excellent electrical insulation performance. Moreover, the MD stretch rate is preferably 400%/s or less in view of obtaining excellent electrical insulation performance during compression. The MD stretch rate is preferably 400%/s or less in view of obtaining a microporous membrane that is difficult to tear during compression.

In contrast, the TD stretch rate is preferably 10 to 100%/s, more preferably 15 to 100%/s, and much more preferably 20 to 100%/s in view of improving the permeability performance and the electrical insulation performance. To optimize the maximum pore diameter and obtain excellent permeability and excellent electrical insulation performance, the TD stretch rate is preferably 10%/s or more. Moreover, to obtain excellent high-temperature electrical insulation performance, the TD stretch rate is preferably 100%/s or less.

Here, as used herein, stretch rate is determined from the length of a practically stretched portion excluding preheating and heat set and the stretch ratio. In addition, if the stretching step is divided into a plurality of smaller steps, stretch rate is determined from the total length and the total stretch ratio.

The ratio of the MD stretch rate to the TD stretch rate is preferably 2 to 4.5, and more preferably 2.5 to 4. To obtain excellent permeability and excellent high-temperature electrical insulation performance, the ratio of the stretch rates is preferably 2 or more, and to increase the electrical insulation performance during compression, the ratio of the stretch rates is preferably 4.5 or less. This range allows for easy control of mechanical strengths in the direction of membrane thickness, the longitudinal direction, and transverse direction and the ratio thereof.

Moreover, in the present embodiment, the stretching process may be performed before the extraction of the plasticizer and the inorganic powder, but the stretching process (especially, sequential biaxial stretching involving machine direction stretching followed by transverse stretching) is more preferably performed after the extraction of the plasticizer and the inorganic powder. An advantage of extraction followed by stretching is ease of obtaining a microporous membrane having a high porosity and excellent permeability.

In addition, as the stretching method, any of a method of stretching a single membrane and a method of stretching a plurality of membranes stacked together can be used. To obtain a high mechanical strength, stretching two or more membranes stacked together is preferable.

As the heat treatment in the (e) step, a heat treatment method such as heat set or thermal relaxation can be used. Such a heat treatment is preferably performed in view of reducing the thermal shrinkage of the microporous polyolefin membrane. Moreover, examples of such a heat treatment step may include a method of heat set with a tenter heat set machine.

The maximum pore diameter of the microporous membrane of the present embodiment is 0.1 μm or more, preferably 0.12 μm or more, and as the upper limit, 0.23 μm or less, more preferably 0.22 μm or less, much more preferably 0.2 μm or less, and most preferably 0.19 μm or less.

The maximum pore diameter is preferably 0.1 μm or more in view of improving the ion permeability and the cycle performance. On the other hand, the maximum pore diameter is preferably 0.23 μm or less in view of improving the electrical insulation performance. Especially, in the present embodiment, withstand voltage and the maximum pore diameter are closely related to each other, and the maximum pore diameter is preferably within a certain range in view of increasing the withstand voltage and realizing good electrical insulation.

The microporous membrane of the present embodiment has a specific MD elastic modulus and a specific ratio of MD elastic modulus to TD elastic modulus in view of electrical insulation performance. Inside batteries, the MD of the separator and the direction of a coated edge of the electrode are often the same.

The MD elastic modulus of the microporous membrane of the present embodiment is 400 MPa or more, preferably 500 MPa or more, more preferably 600 MPa or more, and most preferably 800 MPa or more, and as the upper limit, 2,000 MPa or less. The MD elastic modulus is preferably 400 MPa or more in view of inhibiting membrane rupture by the electrode active material when the microporous membrane undergoes compression to ensure good electrical insulation performance and inhibiting the contact between the electrodes after winding because of the narrow width caused by the MD deformation during battery winding. On the other hand, the MD elastic modulus is preferably 2,000 MPa or less in view of providing good strain absorption when the microporous membrane undergoes compression and inhibiting tearing caused by a coated edge.

The TD elastic modulus of the microporous membrane of the present embodiment is preferably 60 MPa or more, more preferably 70 MPa or more and much more preferably 80 MPa or more, and as the upper limit, preferably 1,000 MPa or less. The TD elastic modulus is preferably 60 MPa or more in view of improving the electrical insulation performance of the microporous membrane when the microporous membrane undergoes compression. On the other hand, the TD elastic modulus is preferably 200 MPa or less in view of improving the high-temperature electrical insulation performance of the microporous membrane.

The ratio of the MD elastic modulus to the TD elastic modulus of the microporous membrane of the present embodiment (sometimes hereinafter referred to as "MD elastic modulus/TD elastic modulus" or "MD/TD elastic modulus ratio") is 1.5 or more and preferably 2 or more, and as the upper limit, 9 or less, preferably 8.5 or less and more preferably 8 or less. The ratio is preferably 1.5 or more in view of inhibiting a short circuit caused by the shrinkage when batteries are exposed to high temperature to realize excellent electrical insulation performance. On the other hand, the ratio is preferably 9 or less in view of inhibiting the microporous membrane from tearing because of a coated edge of the electrode active material when the membrane undergoes compression.

The porosity of the microporous membrane of the present embodiment is 45% or more, preferably 50% or more, more preferably 53% or more, much more preferably 56% or more, particularly preferably 59% or more, and most preferably 59% or more, and as the upper limit, 85% or less, preferably 80% or less, more preferably 75% or less, and much more preferably 70% or less. The porosity is preferably 45% or more in view of realizing excellent strain absorption and improving the cycle performance. On the other hand, the porosity is preferably 85% or less in view of improving the electrical insulation performance when the membrane undergoes compression.

The air permeability of the microporous membrane of the present embodiment is preferably 10 s/100 cc or more, and as the upper limit, preferably 200 s/100 cc or less, more preferably 150 s/100 cc or less, more preferably 120 s/100 cc or less, much more preferably 80 s/100 cc or less, particularly preferably 70 s/100 cc or less, and most preferably 60 s/100 cc or less. The air permeability is preferably 10 s/100 cc or more in view of improving the electrical insulation performance of the microporous membrane when the membrane undergoes compression. On the other hand, the air permeability is preferably 200 s/100 cc or less in view of improving the permeability performance and realizing excellent cycle performance.

The puncture strength of the microporous membrane of the present embodiment is preferably 0.07 N/μm or more, more preferably 0.08 N/μm or more, much more preferably 0.09 N/μm or more, and particularly preferably 0.1 N/μm or more, and as the upper limit, preferably 0.5 N/μm or less, and more preferably 0.3 N/μm or less. The puncture strength of the microporous membrane is preferably 0.07 N/μm or more in view of improving the electrical insulation performance when the membrane undergoes compression. On the other hand, the puncture strength is preferably 0.5 N/μm or less in view of realizing excellent strain absorption and improving the cycle performance.

The MD tensile strength of the microporous membrane of the present embodiment is preferably 50 MPa or more, more preferably 100 MPa or more, and much more preferably 150 MPa or more, and as the upper limit, preferably 500 MPa or less, more preferably 250 MPa or less, and much more preferably 200 MPa or less. The MD tensile strength is preferably 50 MPa or more in view of improving electrical insulation performance of the microporous membrane when the membrane undergoes compression. On the other hand, the MD tensile strength is preferably 500 MPa or less in view of improving the electrical insulation performance of the microporous membrane during battery winding.

The TD tensile strength of the microporous membrane of the present embodiment is preferably 10 MPa or more, and more preferably 15 MPa or more, and as the upper limit, preferably 200 MPa or less, more preferably 100 MPa or less, and much more preferably 50 MPa or less. The TD tensile strength is preferably 10 MPa or more in view of improving the electrical insulation performance of the microporous membrane when the membrane undergoes compression. On the other hand, the TD tensile strength is preferably 200 MPa or less in view of improving the high-temperature electrical insulation performance of the microporous membrane.

The TD maximum shrinkage stress of the microporous membrane of the present embodiment is preferably 0 kPa or more, and as the upper limit, preferably 500 kPa or less, more preferably 400 kPa or less, much more preferably 300 kPa or less, particularly preferably 200 kPa or less, and most preferably 150 kPa or less. The TD maximum shrinkage stress is preferably 500 kPa or less in view of improving the high-temperature electrical insulation performance of the microporous membrane.

The thickness of the microporous membrane of the present embodiment is preferably 10 μm or more and more preferably 15 μm or more, and as the upper limit, preferably 80 μm or less, more preferably 60 μm or less, much more preferably 40 μm or less, particularly preferably 35 μm or less, and most preferably 30 μm or less. The membrane thickness is preferably 10 μm or more in view of realizing excellent strain absorption. On the other hand, the membrane thickness is preferably 80 μm or less in view of realizing excellent permeability.

As a method of determining the membrane thickness before compression from the separator removed from the battery, there is a method of measuring the thickness of a portion which is not in contact with the electrodes.

The pore diameter ratio (maximum pore diameter/average pore diameter) of the microporous membrane of the present embodiment is preferably 1 or more, and as the upper limit, preferably 1.55 or less, more preferably 1.45 or less, and much more preferably 1.4 or less. The pore diameter ratio is preferably 1.55 or less in view of realizing excellent permeability and improving the electrical insulation performance of the microporous membrane when the membrane undergoes compression.

The withstand voltage of the microporous membrane of the present embodiment is preferably greater than 0.3 kV, more preferably greater than 0.5 kV, and most preferably greater than 0.7 kV. To realize excellent electrical insulation performance under any circumstances, the withstand voltage is preferably greater than 0.3 kV.

The thickness variation after pressing of the present embodiment when the membrane is pressed at 55° C. and a pressure of 5 MPa for 30 seconds is preferably 5 μm or more, more preferably 6 μm or more, and much more preferably 7 μm or more, and as the upper limit, preferably 15 μm or less. The amount of change in membrane thickness is preferably 5 μm or more in view of realizing excellent strain absorption. On the other hand, the change in membrane thickness is preferably 15 μm or less in view of realizing excellent electrical insulation performance after compression.

For example, in a process where prismatic batteries are produced, a positive electrode, a negative electrode, and a separator are wound and then hot-pressed to form a wound body, which is then inserted into a cell case. An advantage of the microporous membrane of the present embodiment is that a large amount of change in membrane thickness during pressing thins the membrane thickness by the decrease in membrane thickness and solves the swelling of the wound body after pressing, making it easy to insert the case into the battery. Another advantage is that even after pressing, a portion of the separator which is not in contact with the electrodes encompasses electrode edges, making it difficult for a short circuit to take place due to separator shrinkage even when the temperature of the battery becomes high.

The air permeability of the microporous membrane of the present embodiment when the membrane is pressed at a temperature of 55° C. and a pressure of 5 MPa for 30 seconds (Air permeability after pressing. In the present embodiment, "after pressing" refers to an evaluation value measured after similar press processing is performed) is preferably 10 s/100 cc or more, and as the upper limit, preferably 300 s/100 cc or less, more preferably 250 s/100 cc or less, and much more preferably 200 s/100 cc or less. The air permeability after pressing is preferably 10 s/100 cc or more in view of improving the electrical insulation performance of the microporous membrane when the membrane undergoes compression. On the other hand, the air permeability after pressing is preferably 300 s/100 cc or less in view of improving the permeability performance and realizing excellent cycle performance.

The withstand voltage after pressing of the microporous membrane of the present embodiment is preferably greater than 0.3 kV, more preferably greater than 0.5 kV, and most preferably greater than 0.7 kV. To realize excellent electrical insulation performance in batteries, the withstand voltage is preferably higher than 0.3 kV.

The limiting viscosity ($\eta$) of the microporous membrane of the present embodiment is preferably 3.0 dL/g or more, and more preferably 3.5 dL/g or more, and as the upper limit, preferably 9.0 dL/g or less, and more preferably 8.0 dL/g or less. The limiting viscosity ($\eta$) is preferably 3.0 dL/g or more in view of improving the electrical insulation performance when the membrane undergoes compression. On the other hand, the limiting viscosity ($\eta$) is preferably 9.0 dL/g or less in view of providing a high moldability for the microporous membrane.

The parameters mentioned above can be measured according to the measurement methods in Examples described later.

In addition, the parameters mentioned above can be adjusted by using a known method.

The microporous membrane of the present embodiment can be widely used as membranes for the separation or permselective separation of various substances and as materials for the isolation of various substances. Among them, when the membrane is used as a separator for nonaqueous electrolyte-based secondary batteries (e.g., alloy negative electrode-based lithium-ion secondary batteries) that have recently been developed, use an negative electrode having a high packing density or an alloy negative electrode, and have great electrode swelling and shrinkage, the membrane exhibits remarkable effects (a good balance between strain absorption when the membrane undergoes compression and excellent ion permeability/electrical insulation performance after compression). Especially, when the membrane is used as a separator for prismatic lithium-ion secondary batteries, the effects become more remarkable. Nonaqueous electrolyte-based secondary batteries using the microporous membrane of the present embodiment have excellent cycle performance and reduced battery swelling, and can become batteries having excellent safety.

EXAMPLES

Next, the present embodiment will be described in more detail by using Examples and Comparative Examples. The present embodiment is not limited to the Examples below as long as they do not go beyond the gist of the embodiment. The physical properties of the Examples were measured by the methods below:

[Membrane Thickness (μm)]

The membrane thickness was measured at an ambient temperature of 23±2° C. with a thickness micrometer (Type KBN; terminal diameter φ, 5 mm; measurement pressure, 62.47 kPa) from Toyo Seiki Seisaku-sho, Ltd.

[Porosity (%)]

A sample measuring 100 mm by 100 mm was cut from a microporous membrane, and the volume (mm$^3$) and mass (mg) thereof were determined. These values and the membrane density (g/cm$^3$) were used to calculate the porosity from the formula below:

Porosity=(volume−mass/membrane density)/volume× 100

Here, the volume was calculated from the dimensions and thickness of the sample, and the membrane density was calculated from the material density.

[Air Permeability (s/100 cc)]

The air permeability was measured with a Gurley densometer (G-B2 [trade name], Toyo Seiki Seisaku-sho, Ltd.) according to JIS P 8117. The inner cylinder weighed 567 g, and the time taken for 100 mL of air to pass through an area of 645 mm$^2$ having a diameter of 28.6 mm was measured.

[Puncture Strength (N/μm)]

A Handy-Type Compression Tester, KES-G5 (trade name), from Kato Tech Co., Ltd. was used to fix a microporous membrane with a sample holder having an opening diameter of 11.3 mm. Next, evaluation was made by conducting a piercing test in which a needle tip having a radius of curvature of 0.5 mm pierced the center of the fixed microporous membrane at a piercing speed of 2 mm/s and at an ambient temperature of 25° C. The value obtained was converted to a value in terms of membrane thickness to calculate the puncture strength (in terms of membrane thickness).

[Maximum Pore Diameter (μm)]

The maximum pore diameter was measured by the bubble point method using ethanol according to ASTM E 128-61.

[Average Pore Diameter (μm)]

The average pore diameter was measured by the half-dry method using ethanol according to ASTM F 316-86.

[Pore Diameter Ratio]

The measured maximum pore diameter and the average pore diameter above were used to calculate the pore diameter ratio from the formula below:

Pore diameter ratio=maximum pore diameter/average pore diameter

[Elastic Modulus (MPa), Tensile Strength (MPa), Tensile Elongation (%)]

MD and TD samples (shape, 10 mm wide by 100 mm long) were used to measure these parameters with a tensile tester, Autograph AG-A (trade name) from Shimadzu Corporation according to JIS K 7127. In addition, the samples had a distance of 50 mm between the chucks.

The tensile elongation (%) was calculated by dividing the increase in length when the sample broke (mm) by the distance between the chucks (50 mm) and multiplying the result by 100.

The tensile strength (MPa) was calculated by dividing the strength at break by the cross-sectional area of the sample before the test. Measurements were made at a temperature of 23±2° C., a chuck pressure of 0.30 MPa, and a tensile speed of 200 mm/min.

The tensile modulus (MPa) was evaluated with a slope for an elongation of 1 to 4% on the stress-strain curve obtained.

[TD Maximum Shrinkage Stress (Pa)]

Measurement was made with a thermomechanical analyzer (TMA50, Shimadzu Corporation) under the conditions of a sample length of 10 mm, a sample width of 3 mm, an initial load of 1.0 g, and a rate of temperature rise of 10° C./min. The maximum shrinkage load (g) was determined on the shrinkage-stress curve to calculate the TD maximum shrinkage stress (Pa) from the formula below:

Maximum shrinkage stress={maximum shrinkage load/(3×T)}×100×9.807×10,000 where T=sample thickness (μm), and the direction of the sample length (10 mm) is TD.

[Limiting Viscosity (dL/g)]

The limiting viscosity (η) of the raw material polyolefin and a microporous membrane made therefrom was evaluated as the limiting viscosity (η) in a decalin solvent at 135° C. according to ASTM D 4020.

[Withstand Voltage (kV)]

A microporous membrane was placed between aluminum electrodes having a diameter of 3 cm to which a load of 15 g was then applied. This was connected to a withstand voltage tester (TOS9201) from Kikusui Electronics Corporation for measurement. As the measurement conditions, an alternating voltage (60 Hz) was applied at a rate of 1.0 kV/s, and the value of the voltage at which a short circuit occurred was defined as the measured value of the withstand voltage of the microporous membrane.

[Amount of Change in Membrane Thickness After Pressing (μm)]

20 samples measuring 50 mm by 50 mm were cut out and stacked together. Then, the samples were placed between stainless steel plates having a highly smooth surface and pressed at a temperature of 55° C. and at 5 MPa for 30 seconds. The membrane thicknesses before and after pressing were measured and the change in membrane thickness was calculated from the formula below. The amount of change in membrane thickness after pressing was the average of the changes in membrane thickness after pressing of the 20 samples.

Amount of change in membrane thickness after pressing (μm)=membrane thickness before pressing (average of 20 sample data)−membrane thickness after pressing (average of 20 sample data)

[Air Permeability After Pressing (s/100 cc)]

Pressed membranes were prepared in the same way as in measuring the amount of change in membrane thickness after pressing. The air permeabilities of the pressed membranes were measured by the method above, and the average of the air permeabilities of the 20 membranes was defined as the air permeability after pressing.

[Withstand Voltage After Pressing (kV)]

Pressed membranes were prepared in the same way as in measuring the amount of change in membrane thickness after pressing. The withstand voltages of the pressed membranes were measured by the method above, and the average of the withstand voltages of the 20 membranes was defined as the withstand voltage after pressing.

[Winding Properties]

Evaluation was made based on the criteria below:
○: Could be wound without wrinkles.
X: Wrinkled during winding.

[Evaluation of Prismatic Batteries]

Preparation of a positive electrode: 92.2% by mass of lithium-cobalt composite oxide $LiCoO_2$ as an active material, 2.3% by mass each of a flake graphite and an acetylene black as electrically conductive agents, and 3.2% by mass of a polyvinylidene fluoride (PVDF) as a binder were dispersed in N-methylpyrrolidone (NMP) to prepare a slurry. This slurry was applied onto one side of a 20-μm-thick aluminum foil that would be a positive electrode collector by using a die coater, dried at 130° C. for 3 minutes, and compression-molded with a roll press. In this case, coating was performed so that the amount of positive electrode active material applied was 250 g/m² and the bulk density of the active material was 3.00 g/cm³. The molded product was cut into strips having a width of about 40 mm.

Preparation of a negative electrode: 96.9% by mass of an artificial graphite as an active material, and 1.4% by mass of an ammonium salt of carboxymethylcellulose and 1.7% by mass of a styrene-butadiene copolymer latex as binders were dispersed in purified water to prepare a slurry. This slurry was applied onto one side of a 12-μm-thick copper foil that would be a negative electrode collector by using a die coater, dried at 120° C. for 3 minutes, and compression-molded with a roll press. In this case, the amount of negative electrode active material applied was 106 g/m², and the bulk density of the active material was 1.55 g/cm³, which represented a high packing density. The molded product was cut into strips having a width of about 40 mm.

Preparation of a nonaqueous electrolyte: $LiPF_6$ as a solute was dissolved in a mixed solvent of ethylene carbonate and ethyl methyl carbonate at a mixing ratio of 1 to 2 (v/v) so that the concentration was 1.0 mol/L, to prepare a nonaqueous electrolyte.

Battery assembly: The microporous membrane separator, the positive electrode strip, and the negative electrode strip were stacked in order of the negative electrode strip, the separator, the positive electrode strip, and the separator, and then spirally wound 12 times to prepare an electrode plate laminate. This electrode plate laminate was pressed at a temperature of 55° C. and at 5 MPa for 30 seconds into flat plate form to obtain a battery wound body. The thickness of this battery wound body was measured with calipers.

The battery wound body prepared was housed in an aluminum container, and an aluminum lead coming from the positive electrode collector was connected to the container wall while a nickel lead coming from the negative electrode collector was connected to a container lid terminal portion. The lithium-ion batteries prepared in this way were 6.3 mm long (thick), 30 mm wide, and 48 mm high. The battery capacity was 600 mAh.

Short circuit in the wound body after pressing: A voltage of 100 V was applied to the assembled batteries for a short circuit test. Evaluation was made based on the criteria below. If a short circuit occurred in batteries, the batteries were disassembled to find the cause of the short circuit.

○: No short circuit.

X: Short circuit occurred.

Cycle performance during 500 cycles: cycle performance were evaluated as capacity retention (%). For the initial charging and discharging of the assembled batteries, the batteries were first charged with a constant current of 1/6 C up to a voltage of 4.2 V, and then the current began to be reduced to maintain the constant voltage of 4.2 V and the batteries were initially charged for a total of 8 hours. Next, the batteries were discharged with a current of 1/6 C down to a final voltage of 2.5 V. Then, for cyclic charging and discharging, the batteries were charged and discharged 50 times under the cycling conditions: (i) constant current and constant voltage charging for a total of 8 hours with a current of 0.5 C up to an upper limit voltage of 4.2 V, and, (ii) idleness for 10 minutes, (iii) constant current discharging with a current of 0.5 C down to a final voltage of 2.5 V, and (iv) idleness for 10 minutes. The charging and discharging processes were all at ambient temperatures of 20° C. and 45° C., separately. Then, the capacity retention (%) was calculated by multiplying the ratio of the discharge capacity at cycle number 500 to the discharge capacity at the initial charging by 100.

Oven test: To perform an oven test on assembled batteries, the temperature of the charged batteries were raised from room temperature to 150° C. in steps of 5° C./min, and left to stand at 150° C. for 30 minutes. Evaluation was made based on the criteria below:

○: No ignition.

X: Ignition occurred.

[Evaluation of Cylindrical Batteries]

A positive electrode and a nonaqueous electrolyte were prepared in the same way as in evaluating the prismatic batteries. The preparation of a negative electrode and the assembly of batteries were performed in the following way:

Preparation of a negative electrode: A mixture consisting of 85% by mass of Co—Sn—C powder (elemental composition ratio, 10%:50%:40%) prepared by mechanical alloying as an active material, 5% by mass of carbon black as an electrically conductive aid, and 10% by mass of PVdF as a binder was dispersed in NMP to prepare a slurry. This slurry was applied onto one side of a 12-μm-thick copper foil that would be a negative electrode collector by using a die coater, dried at 125° C. for 3 minutes, and compression-molded with a roll press. In this case, coating was performed so that the amount of active material applied to the negative electrode was 53 g/m², and the bulk density of the active material was 1.35 g/cm³. The molded product was cut into strips having a width of 56 mm.

Battery assembly: The present microporous polyolefin membrane, the positive electrode strip, and the negative electrode strip were stacked in order of the negative electrode strip, the separator, the positive electrode strip, and the separator, and spirally wound multiple times to prepare an electrode plate laminate. In this case, the side having a protrusion of the separator was brought into contact with the active material of the negative electrode strip unless otherwise specified. This electrode plate laminate was housed in a stainless steel container having an outer diameter of 18 mm and a height of 65 mm. An aluminum tab coming from the positive electrode collector was welded to a container lid terminal portion, while a nickel tab coming from the negative electrode collector was welded to the container wall. After that, the battery was dried in vacuum at 85° C. for 12 hours, and then the nonaqueous electrolyte mentioned above was poured into in the container in an argon box and sealed. This battery capacity was 1,800 mAh.

Cycle performance during 50 cycles: The cycle performance were evaluated as capacity retention (%). For the initial charging and discharging of the assembled batteries, the batteries were first charged with a constant current of 1/6 C up to a voltage of 4.2 V, and then the current began to be reduced to maintain the constant voltage of 4.2 V and the batteries were initially charged for a total of 8 hours. Next, the batteries were discharged with a current of 1/6 C down to a final voltage of 2.5 V. Then, for cyclic charging and discharging, the batteries were charged and discharged 50 times under the cycle performance: (i) constant current and constant voltage charging for a total of 8 hours with a current of 0.5 C up to an upper limit voltage of 4.2 V, and, (ii) idleness for 10 minutes, (iii) constant current discharging with a current of 0.5 C down to a final voltage of 2.5 V, and (iv) idleness for 10 minutes. The charging and discharging processes were all at ambient temperatures of 20° C. and 45° C., separately. Then, the capacity retention (%) was calculated by multiplying the ratio of the discharge capacity at cycle number 50 to the discharge capacity at the initial charging by 100.

Example 1

19.2% by mass of an ultra-high molecular weight polyethylene having an (η) of 7.0 dL/g, 12.8% by mass of a high-density polyethylene having an (η) of 2.8 dL/g, 48% by mass of a dioctyl phthalate (DOP), and 20% by mass of a fine silica powder were mixed and pelletized. The pellets were melted and kneaded with a twin-screw extruder with a T-die installed at the tip, and then extruded and rolled with heated rolls from both side to form a 110-μm-thick sheet. The DOP and fine silica powder were extracted and removed from the formed product to prepare microporous membranes (extraction membrane). Two of the microporous membranes were stacked together, and then stretched 5-fold in MD at a stretch rate of 100%/s at 120° C. and 2-fold in TD at a stretch rate of 40%/s at 120° C., and finally heat-treated at 138° C. The physical properties of the microporous membrane obtained were shown in Table 1.

Example 2

Two of the extraction membranes prepared in Example 1 were stacked together and stretched 6-fold in MD at a stretch rate of 120%/s at 120° C. and 2-fold in TD at a stretch rate of 40%/s at 120° C., and finally heat-treated at 135° C. The physical properties obtained were shown in Table 1.

Example 3

Two of the extraction membranes prepared in Example were stacked together and stretched 4.5-fold in MD at a stretch rate of 90%/s at 120° C. and 1.8-fold in TD at a stretch rate of 35%/s at 120° C., and finally heat-treated at 135° C. The physical properties obtained were shown in Table 1.

Example 4

Two of the extraction membranes prepared in Example 1 were stacked together and stretched 6-fold in MD at a stretch rate of 120%/s at 120° C. and 2-fold in TD at a stretch rate of 40%/s at 120° C., and finally heat-treated at 132° C. The physical properties obtained were shown in Table 1.

Example 5

As in Example 1, the pellets were melted, kneaded, and extruded to prepare 130-μm-thick rolled membranes, and then the extraction was conducted, and two of the membranes were stacked together and stretched 4.5-fold in MD at a stretch rate of 90%/s at 120° C. and 1.8-fold in TD at a stretch rate of 35%/s at 120° C., and finally heat-treated at 135° C. The physical properties obtained were shown in Table 1.

Example 6

Two of the extraction membranes prepared in Example 5 were stacked together and stretched 5-fold in MD at a stretch rate of 100%/s at 120° C. and 2-fold in TD at a stretch rate of 40%/s at 120° C., and finally heat-treated at 132° C. The physical properties obtained were shown in Table 1.

Example 7

A polyolefin consisting of 10.2% by mass of an ultra-high molecular weight polyethylene having a (η) of 11.5 dL/g, 10.2% by mass of a high-density polyethylene having a (η) of 1.8 dL/g, 13.6% by mass of a linear low-density polyethylene having a (η) of 1.8 dL/g was used to prepare 110-μm-thick rolled membranes. Then, the extraction was conducted, and then two of the membranes were stacked together, stretched 5-fold in MD at a stretch rate of 100%/s at 115° C. and 2-fold in TD at a stretch rate of 40%/s at 115° C., and finally heat-treated at 125° C. The physical properties obtained were shown in Table 1.

Example 8

The extraction membranes prepared in Example 7 were stretched 6.5-fold in MD at a stretch rate of 130%/s at 115° C. and 2-fold in TD at a stretch rate of 40%/s at 115° C., and finally heat-treated at 125° C. The physical properties obtained were shown in Table 1.

Example 9

Two of the extraction membranes prepared in Example 5 were stacked together and stretched 6-fold in MD at a stretch rate of 120%/s at 115° C. and 2.2-fold in TD at a stretch rate of 45%/s at 115° C., and finally heat-treated at 125° C. The physical properties obtained were shown in Table 1.

Example 10

Two of the extraction membranes prepared in Example 5 were stacked together and stretched 4.5-fold in MD at a stretch rate of 100%/s at 115° C. and 2-fold in TD at a stretch rate of 35%/s at 115° C., and finally heat-treated at 125° C. The physical properties obtained were shown in Table 1.

Example 11

Two of the extraction membranes prepared in Example 5 were stacked together and stretched 4-fold in MD at a stretch rate of 120%/s at 115° C. and 2.5-fold in TD at a stretch rate of 50%/s at 115° C., and finally heat-treated at 125° C. The physical properties obtained were shown in Table 1.

Example 12

Two of the extraction membranes prepared in Example 5 were stacked together and stretched 6-fold in MD at a stretch rate of 300%/s at 115° C. and 1.5-fold in TD at a stretch rate of 90%/s at 115° C., and finally heat-treated at 125° C. The physical properties obtained were shown in Table 1.

Example 13

Two of the extraction membranes prepared in Example 5 were stacked together and stretched 4.5-fold in MD at a stretch rate of 140%/s at 115° C. and 2.5-fold in TD at a stretch rate of 50%/s at 115° C., and finally heat-treated at 125° C. The physical properties obtained were shown in Table 1.

Example 14

Two of the extraction membranes prepared in Example 5 were stacked together and stretched 6.5-fold in MD at a stretch rate of 350%/s at 115° C. and 1.5-fold in TD at a stretch rate of 90%/s at 115° C., and finally heat-treated at 125° C. The physical properties obtained were shown in Table 1.

Example 15

The extraction membranes prepared in Example 5 were stretched 5-fold in MD at a stretch rate of 100%/s at 120° C. and 1.8-fold in TD at a stretch rate of 35%/s at 115° C., and finally heat-treated at 135° C. The physical properties obtained were shown in Table 1.

Example 16

The extraction membranes prepared in Example 7 were stretched 5.5-fold in MD at a stretch rate of 100%/s at 115° C. and 2-fold in TD at a stretch rate of 40%/s at 115° C., and finally heat-treated at 125° C. The physical properties obtained were shown in Table 1.

Example 17

Two of the extraction membranes prepared in Example 5 were stacked together and stretched 5-fold in MD at a stretch rate of 200%/s at 115° C. and 1.8-fold in TD at a stretch rate of 45%/s at 115° C., and finally heat-treated at 125° C. The physical properties obtained were shown in Table 1.

Example 18

Two of the extraction membranes prepared in Example 5 were stacked together and stretched 4-fold in MD at a stretch rate of 100%/s at 115° C. and 2.5-fold in TD at a stretch rate of 45%/s at 115° C., and finally heat-treated at 125° C. The physical properties obtained were shown in Table 1.

TABLE 1

| | | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|
| Production conditions | MD stretching before extraction | Ratio | Times | — | — | — | — | — | — | — | — | — | — |
| | | Rate | %/s | — | — | — | — | — | — | — | — | — | — |
| | MD stretching after extraction | Ratio | Times | 5.0 | 6.0 | 4.5 | 6.0 | 4.5 | 5.0 | 5.0 | 6.5 | 6.0 | 4.5 |
| | | Rate | %/s | 100 | 120 | 90 | 120 | 90 | 100 | 100 | 130 | 120 | 100 |
| | TD stretching before extraction | Ratio | Times | — | — | — | — | — | — | — | — | — | — |
| | | Rate | %/s | — | — | — | — | — | — | — | — | — | — |
| | TD stretching after extraction | Ratio | Times | 2.0 | 2.0 | 1.8 | 2.0 | 1.8 | 2.0 | 2.0 | 2.0 | 2.2 | 2.0 |
| | | Rate | %/s | 40 | 40 | 35 | 40 | 35 | 40 | 40 | 40 | 45 | 35 |
| | Ratio of MD/TD stretch ratios | | | 2.5 | 3.0 | 2.5 | 3.0 | 2.5 | 2.5 | 2.5 | 3.3 | 2.7 | 2.3 |
| | Ratio of MD/TD stretch rates | | | 2.5 | 3.0 | 2.6 | 3.0 | 2.6 | 2.5 | 2.5 | 3.3 | 2.7 | 2.9 |
| Physical properties of microporous membranes | Membrane thickness | | μm | 20 | 20 | 25 | 25 | 30 | 35 | 20 | 25 | 30 | 25 |
| | Porosity | | % | 62 | 66 | 61 | 70 | 62 | 66 | 62 | 61 | 78 | 53 |
| | Air permeability | | s/100 cc | 55 | 30 | 55 | 35 | 60 | 50 | 55 | 45 | 20 | 70 |
| | Air permeability (in terms of membrane thickness) | | s/μm/100 cc | 2.8 | 1.5 | 2.2 | 1.4 | 2.0 | 1.4 | 2.8 | 1.8 | 0.7 | 2.8 |
| | Maximum pore diameter | | μm | 0.16 | 0.19 | 0.17 | 0.19 | 0.17 | 0.18 | 0.15 | 0.17 | 0.21 | 0.13 |
| | Average pore diameter | | μm | 0.12 | 0.15 | 0.13 | 0.15 | 0.13 | 0.13 | 0.11 | 0.13 | 0.16 | 0.11 |
| | Pore diameter ratio | | | 1.33 | 1.27 | 1.31 | 1.27 | 1.31 | 1.38 | 1.36 | 1.31 | 1.31 | 1.18 |
| | Puncture strength | | N | 3.6 | 2.7 | 4.2 | 3.3 | 4.3 | 4.3 | 4.1 | 3.5 | 3.0 | 3.5 |
| | Puncture strength (in terms of membrane thickness) | | N/μm | 0.180 | 0.135 | 0.168 | 0.132 | 0.143 | 0.123 | 0.205 | 0.140 | 0.100 | 0.140 |
| | MD elastic modulus | | MPa | 850 | 900 | 530 | 650 | 490 | 470 | 630 | 950 | 700 | 600 |
| | TD elastic modulus | | MPa | 160 | 110 | 110 | 80 | 100 | 90 | 110 | 120 | 140 | 110 |
| | MD/TD elastic modulus ratio | | | 5.3 | 8.2 | 4.8 | 8.1 | 4.9 | 5.2 | 5.7 | 7.9 | 5.0 | 5.5 |
| | MD tensile strength | | MPa | 220 | 210 | 140 | 150 | 130 | 110 | 180 | 230 | 190 | 160 |
| | TD tensile strength | | MPa | 30 | 26 | 21 | 20 | 20 | 20 | 180 | 190 | 30 | 30 |
| | MD tensile elongation | | % | 30 | 25 | 35 | 20 | 35 | 35 | 40 | 20 | 20 | 50 |
| | TD tensile elongation | | % | 170 | 180 | 150 | 150 | 190 | 190 | 320 | 360 | 150 | 180 |
| | TD maximum shrinkage stress | | kPa | 120 | 120 | 110 | 140 | 240 | 260 | 230 | 240 | 120 | 120 |
| | Withstand voltage | | kV | 1.1 | 0.9 | 1.3 | 1.0 | 1.5 | 1.4 | 1.2 | 1.3 | 0.8 | 1.4 |
| Press evaluation | Change in membrane thickness after pressing | | μm | 5.5 | 7.0 | 7.0 | 10.0 | 9.5 | 12.5 | 6.0 | 7.5 | 14.0 | 6.5 |
| | Air permeability after pressing | | s/100 cc | 180 | 80 | 170 | 190 | 210 | 230 | 200 | 210 | 130 | 190 |
| | Withstand voltage after pressing | | kV | 1.1 | 0.9 | 1.3 | 1.0 | 1.5 | 1.3 | 1.2 | 1.3 | 0.9 | 1.4 |
| Rectangular battery evaluation | Winding properties | | | ○ | ○ | ○ | ○ | ○ | ○ | ○ | ○ | ○ | ○ |
| | Wound body thickness | | mm | 4.5 | 4.3 | 4.6 | 4.3 | 4.6 | 4.7 | 4.5 | 4.4 | 4.3 | 4.4 |
| | Short circuit in wound body after pressing | | | ○ | ○ | ○ | ○ | ○ | ○ | ○ | ○ | ○ | ○ |
| | Cycle performance during 500 cycles | | % | 90 | 95 | 90 | 90 | 90 | 90 | 90 | 90 | 95 | 90 |
| | Battery thickness | | mm | 6.3 | 6.3 | 6.3 | 6.3 | 6.3 | 6.3 | 6.3 | 6.3 | 6.3 | 6.3 |
| | Oven test | | | ○ | ○ | ○ | ○ | ○ | ○ | ○ | ○ | ○ | ○ |
| Cylindrical battery evaluation | Cycle performance during 50 cycles | | % | 80 | 80 | 80 | 85 | 85 | 90 | 80 | 80 | 90 | 85 |

| | | | | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| Production conditions | MD stretching before extraction | Ratio | Times | — | — | — | — | — | — | — | — |
| | | Rate | %/s | — | — | — | — | — | — | — | — |

TABLE 1-continued

|  |  |  |  |  |  |  |  |  |  |  |
|---|---|---|---|---|---|---|---|---|---|---|
|  | MD stretching after extraction | Ratio Rate | Times %/s | 4.0 120 | 6.0 300 | 4.5 140 | 6.5 350 | 5.0 90 | 5.5 100 | 5.0 200 | 4.0 100 |
|  | TD stretching before extraction | Ratio Rate | Times %/s | — — | — — | — — | — — | — — | — — | — — | — — |
|  | TD stretching after extraction | Ratio Rate | Times %/s | 2.5 50 | 1.5 90 | 2.5 50 | 1.5 90 | 1.8 35 | 2.0 40 | 1.8 45 | 2.5 45 |
|  | Ratio of MD/TD stretch ratios |  |  | 1.6 | 4.0 | 1.8 | 4.3 | 2.5 | 2.5 | 2.8 | 1.6 |
|  | Ratio of MD/TD stretch rates |  |  | 2.4 | 3.3 | 2.8 | 3.9 | 2.6 | 2.5 | 4.4 | 2.2 |
| Physical properties of microporous membranes | Membrane thickness | | μm | 25 | 25 | 30 | 30 | 15 | 9 | 20 | 25 |
|  | Porosity | | % | 58 | 60 | 65 | 65 | 59 | 56 | 48 | 82 |
|  | Air permeability | | s/100 cc | 60 | 70 | 40 | 50 | 30 | 27 | 100 | 15 |
|  | Air permeability (in terms of membrane thickness) | | s/μm/100 cc | 2.4 | 2.8 | 1.3 | 1.7 | 2.0 | 3.0 | 5.0 | 0.6 |
|  | Maximum pore diameter | | μm | 0.12 | 0.13 | 0.21 | 0.22 | 0.16 | 0.14 | 0.12 | 0.22 |
|  | Average pore diameter | | μm | 0.10 | 0.11 | 0.16 | 0.17 | 0.13 | 0.11 | 0.10 | 0.16 |
|  | Pore diameter ratio | |  | 1.20 | 1.18 | 1.31 | 1.29 | 1.23 | 1.27 | 1.20 | 1.38 |
|  | Puncture strength | | N | 3.3 | 3.5 | 3.1 | 3.3 | 2.3 | 2.1 | 4.0 | 2.5 |
|  | Puncture strength (in terms of membrane thickness) | | N/μm | 0.132 | 0.140 | 0.103 | 0.110 | 0.153 | 0.233 | 0.200 | 0.100 |
|  | MD elastic modulus | | MPa | 500 | 1000 | 600 | 1100 | 510 | 650 | 900 | 420 |
|  | TD elastic modulus | | MPa | 200 | 125 | 200 | 130 | 100 | 110 | 100 | 170 |
|  | MD/TD elastic modulus ratio | |  | 2.5 | 8.0 | 3.0 | 8.5 | 5.1 | 5.9 | 9.0 | 2.5 |
|  | MD tensile strength | | MPa | 120 | 230 | 130 | 240 | 140 | 190 | 200 | 100 |
|  | TD tensile strength | | MPa | 50 | 40 | 50 | 40 | 30 | 30 | 20 | 40 |
|  | MD tensile elongation | | % | 50 | 25 | 40 | 20 | 30 | 35 | 30 | 40 |
|  | TD tensile elongation | | % | 120 | 150 | 120 | 160 | 190 | 310 | 190 | 150 |
|  | TD maximum shrinkage stress | | kPa | 130 | 260 | 140 | 270 | 120 | 110 | 240 | 240 |
|  | Withstand voltage | | kV | 1.4 | 1.2 | 1.1 | 1.1 | 0.9 | 0.8 | 1.1 | 0.6 |
| Press evaluation | Change in membrane thickness after pressing | | μm | 7.0 | 6.5 | 10.0 | 9.0 | 5.0 | 4.5 | 4.0 | 13.0 |
|  | Air permeability after pressing | | s/100 cc | 180 | 210 | 190 | 200 | 110 | 90 | 280 | 130 |
|  | Withstand voltage after pressing | | kV | 1.4 | 1.2 | 1.1 | 1.1 | 0.9 | 0.8 | 1.1 | 0.6 |
| Rectangular battery evaluation | Winding properties | |  | ○ | ○ | ○ | ○ | ○ | ○ | ○ | ○ |
|  | Wound body thickness | | mm | 4.5 | 4.6 | 4.4 | 4.4 | 4.6 | 4.5 | 5.0 | 4.3 |
|  | Short circuit in wound body after pressing | |  | ○ | ○ | ○ | ○ | ○ | ○ | ○ | ○ |
|  | Cycle performance during 500 cycles | | % | 90 | 85 | 90 | 85 | 90 | 90 | 70 | 95 |
|  | Battery thickness | | mm | 6.3 | 6.3 | 6.3 | 6.3 | 6.3 | 6.3 | 6.6 | 6.3 |
|  | Oven test | |  | ○ | ○ | ○ | ○ | ○ | ○ | ○ | ○ |
| Cylindrical battery evaluation | Cycle performance during 50 cycles | | % | 80 | 80 | 85 | 80 | 85 | 80 | 70 | 90 |

Comparative Example 1

Two of the extraction membranes prepared in Example 1 were stacked together and stretched 2-fold in MD at a stretch rate of 40%/s at 120° C. and 8-fold in TD at a stretch rate of 40%/s at 120° C., and finally heat-treated at 125° C. The physical properties obtained were shown in Table 2. The MD elastic modulus was low, causing poor winding properties. In addition, the maximum pore diameter was too large, causing poor electrical insulation performance.

Comparative Example 2

One of the extraction membranes prepared in Example 1 was stretched 4-fold in MD at a stretch rate of 80%/s at 120° C. The physical properties obtained were shown in Table 2. The ratio MD elastic modulus/TD elastic modulus was high, causing a short circuit due to tearing in a short circuit test on a prismatic battery wound body.

Comparative Example 3

Two of the extraction membranes prepared in Example 7 were stacked together and stretched 4-fold in MD at a stretch rate of 100%/s at 118° C. and 4-fold in TD at a stretch rate of 20%/s at 118° C., and finally heat-treated at 125° C. The physical properties obtained were shown in Table 2. The maximum pore diameter was too large, causing poor electrical insulation performance. In addition, the ratio MD elastic modulus/TD elastic modulus was low, resulting in failure to pass an oven test.

Comparative Example 4

Two of the extraction membranes prepared in Example 7 were stacked together and stretched 4.5-fold in MD at a stretch rate of 100%/s at 115° C. and 2.2-fold in TD at a stretch rate of 2%/s at 115° C., and finally heat-treated at 125° C. The physical properties obtained were shown in Table 2. The maximum pore diameter was too large, causing poor electrical insulation performance. In addition, the pore diameter distribution was broad, causing poor permeability performance after compression.

Comparative Example 5

25% by mass of a high-density polyethylene having an (η) of 2.8 dL/g, 50% by mass of DOP, and 25% by mass of a fine silica powder were mixed and pelletized. The pellets were melted and kneaded with a twin-screw extruder with a T-die installed at the tip, and then extruded and rolled with heated rolls from both side to form a 110-μm-thick sheet. One of the extraction membranes prepared in Example 1 was stretched 3.5-fold in MD at a stretch rate of 70%/s at 115° C. and 1.5-fold in TD at a stretch rate of 30%/s at 115° C., and finally heat-treated at 120° C. The physical properties obtained were shown in Table 2. The MD elastic modulus was low, causing poor winding properties. In addition, the puncture strength was low, causing a short circuit due to tearing in a short circuit test on a prismatic battery wound body.

Comparative Example 6

60% by mass of an ultra-high molecular weight polyethylene having an (η) of 7.0 dL/g and 40% by mass of a high-density polyethylene having an (η) of 2.8 dL/g were dry blended with a tumbler blender to obtain a polymer mixture. The polymer mixture obtained was fed to a twin-screw extruder by using a feeder while a liquid paraffin was injected into the extruder cylinder by using a pump. In melting and kneading, the feeder and the pump were adjusted so that the content of the liquid paraffin in the entire mixture extruded was 60% by mass. The extrudate was passed through the T-die and rolled with cooled rolls whose surface temperature was maintained at 30° C. to prepare a 1,600-μm-thick membrane in sheet form.

Next, the membrane was fed to a simultaneous biaxial tenter stretching machine and simultaneously stretched biaxially 7-fold in MD and 6.3-fold in TD at a stretch rate of 40%/s at 120° C. and then the liquid paraffin was extracted and removed from the membrane.

Furthermore, the resulting membrane was stretched 1.1-fold at 120° C. at a stretch rate of 10%/s with a TD tenter heat set machine and finally heat-treated at 135° C. The physical properties of the microporous membrane obtained were shown in Table 2.

The porosity is low, which causes a small amount of change in membrane thickness after pressing, and the air permeability is high, which causes a high air permeability after pressing, resulting in poor cushioning properties as well as poor cycle performance when a negative electrode causing great swelling is used. In addition, the MD/TD elastic modulus ratio was low, resulting in failure to pass an oven test.

Comparative Example 7

The rolled membrane of Comparative Example 6 was simultaneously stretched biaxially 5-fold in MD and 5-fold in TD at a stretch rate of 30%/s at 120° C. and then the liquid paraffin was extracted and removed from the membrane.

Furthermore, the resulting membrane was stretched 1.5-fold at a stretch rate of 20%/s at 120° C. with a TD tenter heat set machine and finally heat-treated at 135° C. The physical properties of the microporous membrane obtained were shown in Table 2.

The air permeability is high, which causes a high air permeability after pressing, resulting in poor cushioning properties as well as poor cycle performance when a negative electrode causing great swelling is used. In addition, the MD/TD elastic modulus ratio was low, resulting in failure to pass an oven test.

Comparative Example 8

Two of the extraction membranes prepared in Example 1 were stacked together and stretched 3.5-fold in MD at a stretch rate of 200%/s at 115° C. and 1.2-fold in TD at a stretch rate of 120%/s at 115° C., and finally heat-treated at 125° C. The physical properties obtained were shown in Table 2.

Comparative Example 9

Two of the extraction membranes prepared in Example 1 were stacked together and stretched 5-fold in MD at a stretch rate of 250%/s at 115° C. and 1.2-fold in TD at a stretch rate of 120%/s at 115° C., and finally heat-treated at 125° C. The physical properties obtained were shown in Table 2.

Comparative Example 10

Two of the extraction membranes prepared in Example 1 were stacked together and stretched 6-fold in MD at a stretch rate of 300%/s at 115° C. and 1.1-fold in TD at a stretch rate of 110%/s at 115° C., and finally heat-treated at 125° C. The physical properties obtained were shown in Table 2.

Comparative Example 11

Two of the extraction membranes prepared in Example 7 were stacked together and stretched 5.3-fold in MD at a stretch rate of 1,000%/s at 118° C. and 1.8-fold in TD at a stretch rate of 20%/s at 118° C., and finally heat-treated at 125° C. The physical properties obtained were shown in Table 2.

Comparative Example 12

Two of the extraction membranes prepared in Example 7 were stacked together and stretched 5-fold in MD at a stretch rate of 500%/s at 118° C. and 1.6-fold in TD at a stretch rate of 2%/s at 118° C., and finally heat-treated at 125° C. The physical properties obtained were shown in Table 2.

Comparative Example 13

Two of the extraction membranes prepared in Example 7 were stacked together and stretched 6.2-fold in MD at a stretch rate of 1,000%/s at 118° C. and 1.8-fold in TD at a stretch rate of 20%/s at 118° C., and finally heat-treated at 125° C. The physical properties obtained were shown in Table 2.

Comparative Example 14

Two of the extraction membranes prepared in Example 7 were stacked together and stretched 5-fold in MD at a stretch rate of 5%/s at 118° C. and 2-fold in TD at a stretch rate of 2%/s at 118° C., and finally heat-treated at 125° C. The physical properties obtained were shown in Table 2.

Comparative Example 15

Two of the extraction membranes prepared in Example 7 were stacked together and stretched 5-fold in MD at a stretch rate of 10%/s at 118° C. and 2-fold in TD at a stretch rate of 1%/s at 118° C., and finally heat-treated at 125° C. The physical properties obtained were shown in Table 2.

Comparative Example 16

5% by mass of an ultra-high molecular weight polyethylene having an (η) of 11.5 dL/g and 23% by mass of a high-density polyethylene having an (η) of 2.8 dL/g were dry blended with a tumbler blender to obtain a polymer mixture. The polymer mixture obtained was fed to a twin-screw extruder by using a feeder while a liquid paraffin was injected into the extruder cylinder by using a pump. In melting and kneading, the feeder and the pump were adjusted so that the content of the liquid paraffin in the entire mixture extruded was 72% by mass. The extrudate was passed through the T-die and rolled with cooled rolls whose surface temperature was maintained at 40° C. to prepare a 1,400-μm-thick membrane in sheet form.

Next, the membrane was fed to a simultaneous biaxial tenter stretching machine and simultaneously stretched biaxially 5-fold in MD and 5-fold in TD at a stretch rate of 30%/s at 124° C. and then the liquid paraffin was extracted and removed from the membrane. Next, the resulting membrane was stretched 1.1-fold in MD at a stretch rate of 11%/s at 120° C., stretched 1.3-fold in TD at a stretch rate of 13%/s at 120° C., and finally heat-treated at 130° C. The physical properties of the microporous membrane obtained were shown in Table 2.

Comparative Example 17

5% by mass of an ultra-high molecular weight polyethylene having an (η) of 11.5 dL/g and 23% by mass of a high-density polyethylene having an (η) of 2.8 dL/g were dry blended with a tumbler blender to obtain a polymer mixture. The polymer mixture obtained was fed to a twin-screw extruder by using a feeder while a liquid paraffin was injected into the extruder cylinder by using a pump. In melting and kneading, the feeder and the pump were adjusted so that the content of the liquid paraffin in the entire mixture extruded was 72% by mass. The extrudate was passed through the T-die and rolled with cooled rolls whose surface temperature was maintained at 40° C. to prepare a 2,000-μm-thick membrane in sheet form.

Next, the membrane was fed to a simultaneous biaxial tenter stretching machine and simultaneously stretched biaxially 5-fold in MD and 5-fold in TD at a stretch rate of 30%/s at 117° C. In this case, when the membrane was stretched 2.5-fold in MD and 2.5-fold in TD, the temperature was raised from 117° C. to 125° C. in steps of 1° C./s while the stretching was continued. Then, the liquid paraffin was extracted and removed from the membrane. Next, the resulting membrane was stretched 1.5-fold in TD at a stretch rate of 15%/s at 110° C. and finally heat-treated at 110° C. The physical properties of the microporous membrane obtained were shown in Table 2.

TABLE 2

| | | | | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|---|---|---|
| Production conditions | MD stretching before extraction | Ratio | Times | — | — | — | — | — | 7.0 | 5.0 | — | — |
| | | Rate | %/s | — | — | — | — | — | 40 | 30 | — | — |
| | MD stretching after extraction | Ratio | Times | 2.0 | 4.0 | 4.0 | 4.5 | 3.5 | — | — | 3.5 | 5.0 |
| | | Rate | %/s | 40 | 80 | 100 | 100 | 70 | — | — | 200 | 250 |
| | TD stretching before extraction | Ratio | Times | — | — | — | — | — | 6.3 | 5.0 | — | — |
| | | Rate | %/s | — | — | — | — | — | 40 | 30 | — | — |
| | TD stretching after extraction | Ratio | Times | 8.0 | — | 4.0 | 2.2 | 1.5 | 1.1 | 1.5 | 1.2 | 1.2 |
| | | Rate | %/s | 40 | — | 20 | 2 | 30 | 10 | 20 | 120 | 120 |
| | Ratio of MD/TD stretch ratios | | | 0.3 | — | 1.0 | 2.0 | 2.3 | 1.0 | 0.7 | 2.9 | 4.2 |
| | Ratio of MD/TD stretch rates | | | 1.0 | — | 5.0 | 50.0 | 2.3 | 0.7 | 0.8 | 1.7 | 2.1 |
| Physical properties of microporous membranes | Membrane thickness | | μm | 25 | 25 | 25 | 25 | 25 | 25 | 30 | 20 | 20 |
| | Porosity | | % | 65 | 60 | 68 | 55 | 65 | 40 | 61 | 40 | 44 |
| | Air permeability | | s/100 cc | 40 | 80 | 40 | 75 | 30 | 400 | 100 | 300 | 150 |
| | Air permeability (in terms of membrane thickness) | | s/μm/100 cc | 1.6 | 3.2 | 1.6 | 3.0 | 1.2 | 16.0 | 3.3 | 15.0 | 12.5 |
| | Maximum pore diameter | | μm | 0.70 | 0.13 | 0.25 | 0.25 | 0.21 | 0.05 | 0.10 | 0.09 | 0.09 |
| | Average pore diameter | | μm | 0.32 | 0.10 | 0.14 | 0.15 | 0.15 | 0.04 | 0.08 | 0.07 | 0.07 |
| | Pore diameter ratio | | | 2.19 | 1.30 | 1.79 | 1.67 | 1.40 | 1.25 | 1.25 | 1.29 | 1.29 |
| | Puncture strength | | N | 2.0 | 2.1 | 2.3 | 2.8 | 0.7 | 6.0 | 4.0 | 4.5 | 4.2 |
| | Puncture strength (in terms of membrane thickness) | | N/μm | 0.080 | 0.084 | 0.092 | 0.112 | 0.028 | 0.240 | 0.133 | 0.225 | 0.210 |
| | MD elastic modulus | | MPa | 80 | 600 | 430 | 450 | 350 | 550 | 450 | 450 | 900 |
| | TD elastic modulus | | MPa | 500 | 50 | 480 | 100 | 70 | 420 | 600 | 150 | 130 |
| | MD/TD elastic modulus ratio | | | 0.2 | 12.0 | 0.9 | 4.3 | 5.0 | 1.3 | 0.8 | 3.0 | 6.9 |
| | MD tensile strength | | MPa | 30 | 90 | 130 | 100 | 40 | 110 | 60 | 130 | 190 |
| | TD tensile strength | | MPa | 190 | 190 | 160 | 30 | 40 | 110 | 80 | 40 | 40 |
| | MD tensile elongation | | % | 180 | 30 | 50 | 35 | 180 | 70 | 90 | 60 | 20 |
| | TD tensile elongation | | % | 20 | 450 | 40 | 170 | 200 | 80 | 30 | 350 | 350 |
| | TD maximum shrinkage stress | | kPa | 1620 | 120 | 1270 | 220 | 360 | 1540 | 2090 | 130 | 120 |
| | Withstand voltage | | kV | 0.2 | 1.0 | 0.5 | 0.4 | 0.7 | 1.5 | 1.0 | 1.3 | 1.2 |
| Press evaluation | Change in membrane thickness after pressing | | μm | 7.0 | 4.0 | 5.5 | 3.5 | 7.5 | 1.0 | 8.0 | 2.0 | 2.3 |
| | Air permeability after pressing | | s/100 cc | 120 | 350 | 190 | 320 | 100 | 1000 | 500 | 800 | 700 |
| | Withstand voltage after pressing | | kV | 0.1 | 1.0 | 0.3 | 0.2 | 0.7 | 1.5 | 1.0 | 1.3 | 1.2 |
| Rectangular battery evaluation | Winding properties | | | X Wrinkled | ○ | ○ | ○ | X Wrinkled | ○ | ○ | ○ | ○ |

TABLE 2-continued

|  |  |  |  |  |  |  |  |  |  |  |
|---|---|---|---|---|---|---|---|---|---|---|
|  | Wound body thickness | mm | 4.3 | 4.5 | 4.3 | 4.4 | 4.3 | 5.5 Swelled | 4.5 | 5.5 Swelled | 5.3 Swelled |
|  | Short circuit in wound body after pressing |  | X | X Tore | ○ | ○ | X | ○ | ○ | ○ | ○ |
|  | Cycle performance during 500 cycles | % | — | — | 80 | 65 | — | 50 | 60 | 50 | 50 |
|  | Battery thickness | mm | — | — | 6.3 | 6.3 | — | 6.9 | 6.3 | 6.9 | 6.8 |
|  | Oven test |  | — | — | X | ○ | — | X | X | ○ | ○ |
| Cylindrical battery evaluation | Cycle performance during 50 cycles |  | — | — | 80 | 60 | — | 40 | 50 | 30 | 40 |

|  |  |  |  | Com. Ex. 10 | Com. Ex. 11 | Com. Ex. 12 | Com. Ex. 13 | Com. Ex. 14 | Com. Ex. 15 | Com. Ex. 16 | Com. Ex. 17 |
|---|---|---|---|---|---|---|---|---|---|---|---|
| Production conditions | MD stretching before extraction | Ratio | Times | — | — | — | — | — | — | 5.0 | 5.0 |
|  |  | Rate | %/s | — | — | — | — | — | — | 30 | 30 |
|  | MD stretching after extraction | Ratio | Times | 6.0 | 5.3 | 5.0 | 6.2 | 5.0 | 5.0 | 1.1 | — |
|  |  | Rate | %/s | 300 | 1000 | 500 | 1000 | 5 | 10 | 11 | — |
|  | TD stretching before extraction | Ratio | Times | — | — | — | — | — | — | 5.0 | 5.0 |
|  |  | Rate | %/s | — | — | — | — | — | — | 30 | 30 |
|  | TD stretching after extraction | Ratio | Times | 1.1 | 1.8 | 1.6 | 1.8 | 2.0 | 2.0 | 1.3 | 1.5 |
|  |  | Rate | %/s | 110 | 20 | 2 | 20 | 2 | 1 | 13 | 15 |
|  | Ratio of MD/TD stretch ratios |  |  | 5.5 | 2.9 | 3.1 | 3.4 | 1.0 | 2.5 | 1.0 | 1.3 |
|  | Ratio of MD/TD stretch rates |  |  | 2.7 | 50.0 | 250.0 | 50.0 | 2.5 | 10.0 | 0.8 | 0.7 |
| Physical properties of microporous membranes | Membrane thickness | μm |  | 20 | 22 | 25 | 18 | 25 | 25 | 20 | 29 |
|  | Porosity | % |  | 48 | 50 | 50 | 46 | 50 | 50 | 38 | 62 |
|  | Air permeability | s/100 cc |  | 160 | 110 | 90 | 120 | 60 | 70 | 260 | 85 |
|  | Air permeability (in terms of membrane thickness) | s/μm/100 cc |  | 8.0 | 5.0 | 3.6 | 6.7 | 2.4 | 2.8 | 13.0 | 2.9 |
|  | Maximum pore diameter | μm |  | 0.09 | 0.13 | 0.20 | 0.12 | 0.25 | 0.25 | 0.07 | 0.09 |
|  | Average pore diameter | μm |  | 0.05 | 0.10 | 0.13 | 0.09 | 0.14 | 0.12 | 0.05 | 0.07 |
|  | Pore diameter ratio |  |  | 1.80 | 1.30 | 1.54 | 1.33 | 1.79 | 2.08 | 1.40 | 1.29 |
|  | Puncture strength | N |  | 4.0 | 4.0 | 4.0 | 4.2 | 4.0 | 4.0 | 6.0 | 2.3 |
|  | Puncture strength (in terms of membrane thickness) | N/μm |  | 0.200 | 0.182 | 0.160 | 0.233 | 0.160 | 0.160 | 0.300 | 0.079 |
|  | MD elastic modulus | MPa |  | 1000 | 1500 | 1200 | 2100 | 380 | 450 | 500 | 50 |
|  | TD elastic modulus | MPa |  | 80 | 125 | 110 | 150 | 50 | 40 | 550 | 60 |
|  | MD/TD elastic modulus ratio |  |  | 12.5 | 12.0 | 10.9 | 14.0 | 7.6 | 11.3 | 0.9 | 0.8 |
|  | MD tensile strength | MPa |  | 200 | 220 | 210 | 350 | 90 | 120 | 145 | 30 |
|  | TD tensile strength | MPa |  | 30 | 40 | 30 | 40 | 20 | 20 | 152 | 40 |
|  | MD tensile elongation | % |  | 10 | 10 | 10 | 5 | 40 | 30 | 170 | 300 |
|  | TD tensile elongation | % |  | 360 | 200 | 250 | 180 | 300 | 320 | 150 | 240 |
|  | TD maximum shrinkage stress | kPa |  | 120 | 240 | 220 | 230 | 220 | 200 | 1600 | 1900 |
|  | Withstand voltage | kV |  | 1.1 | 1.1 | 1.1 | 1.0 | 0.5 | 0.4 | 1.5 | 0.9 |
| Press evaluation | Change in membrane thickness after pressing | μm |  | 2.6 | 2.8 | 3.1 | 1.1 | 3.2 | 3.1 | 3.9 | 7.3 |
|  | Air permeability after pressing | s/100 cc |  | 550 | 450 | 400 | 480 | 220 | 190 | 460 | 190 |
|  | Withstand voltage after pressing | kV |  | 1.1 | 1.1 | 1.1 | 1.0 | 0.3 | 0.3 | 1.5 | 0.9 |
| Rectangular battery evaluation | Winding properties |  |  | ○ | ○ | ○ | ○ | X | ○ | ○ | X Wrinkled |
|  | Wound body thickness | mm |  | 5.3 Swelled | 5.0 | 5.0 | 5.5 Swelled | 5.0 | 5.0 | 5.0 | 4.5 |
|  | Short circuit in wound body after pressing |  |  | X | X | X | X | X | X | ○ | X |
|  | Cycle performance during 500 cycles | % |  | — | — | — | — | — | — | 50 | — |
|  | Battery thickness | mm |  | — | — | — | — | — | — | 6.7 | — |
|  | Oven test |  |  | — | — | — | — | — | — | X | — |
| Cylindrical battery evaluation | Cycle performance during 50 cycles |  |  | — | — | — | — | — | — | 40 | — |

The invention claimed is:

1. A microporous polyolefin membrane having a porosity of 45% to 85%, wherein
a maximum pore diameter is 0.1 μm to 0.23 μm;
a longitudinal (MD) elastic modulus is 400 MPa to 2,000 MPa; and
a ratio of the MD elastic modulus to a transverse (TD) elastic modulus is 1.5 to 9; and
a content of a polyolefin resin in all components is 60% by mass or more.

2. The microporous polyolefin membrane according to claim 1, wherein a MD tensile strength is 50 to 500 MPa.

3. The microporous polyolefin membrane according to claim 1 or 2, wherein a TD tensile strength is 10 MPa to 200 MPa.

4. The microporous polyolefin membrane according to claim 1 or 2, wherein a TD elastic modulus is 60 MPa to 1,000 MPa.

5. The microporous polyolefin membrane according to claim 1 or 2, wherein a TD maximum shrinkage stress is 500 kPa or less.

6. The microporous polyolefin membrane according to claim 1 or 2, wherein a pore diameter ratio of the maximum pore diameter to an average pore diameter (maximum pore diameter/average pore diameter) is 1 to 1.55.

7. The microporous polyolefin membrane according to claim 1 or 2, comprising 5% by mass to 90% by mass of an ultra-high molecular weight polyethylene having a limiting viscosity ($\eta$) of 5.5 dL/g to 33 dL/g.

8. A nonaqueous electrolyte-based secondary battery separator, comprising the microporous polyolefin membrane according to claim 1 or 2.

9. The nonaqueous electrolyte-based secondary battery separator according to claim 8, wherein the separator is used as an alloy negative electrode-based lithium-ion secondary battery separator or a rectangular lithium-ion secondary battery separator.

10. A nonaqueous electrolyte-based secondary battery, comprising the nonaqueous electrolyte-based secondary battery separator according to claim 8.

* * * * *